235-380

XR  3,656,110

United States Patent
Crane

[15] 3,656,110
[45] Apr. 11, 1972

[54] CREDIT CARD ASSOCIATED APPARATUS FOR PERSONNEL IDENTIFICATION

[72] Inventor: Charles V. Crane, Olathe, Kans.

[73] Assignee: C & S Security Devices Inc., Olathe, Kans.

[22] Filed: Nov. 20, 1969

[21] Appl. No.: 878,445

[52] U.S. Cl............................................340/149, 340/164
[51] Int. Cl..........................................H04q 5/16, G06k 7/06
[58] Field of Search...........................................340/149, 164

[56] References Cited

UNITED STATES PATENTS

| | | | |
|---|---|---|---|
| 3,080,547 | 3/1953 | Cooper | 340/164 |
| 3,100,389 | 8/1963 | Noregaard | 340/164 UX |
| 3,221,304 | 11/1965 | Enikeieff | 340/149 A |
| 3,335,405 | 8/1967 | Gardberg | 340/164 |
| 3,515,340 | 6/1970 | Mika | 340/149 X |
| 2,855,588 | 10/1958 | Allen | 340/164 UX |
| 3,441,808 | 4/1969 | Crane | 340/164 X |

*Primary Examiner*—Harold I. Pitts
*Attorney*—Scofield, Kokjer, Scofield & Lowe

[57] ABSTRACT

A device-implemented process for verifying the identity of the bearer of a document or card without physically utilizing the document or card in said process includes the steps of assigning a first code for said document or card which is known to said bearer but which does not appear on said document or card, assigning a second code to said document or card which is visibly placed on same, programming a code interpreting device with said second code, comparing said second programed code with said first code by utilizing said device, and indicating by said device when said first code corresponds to said second code as a result of a comparing step, said corresponding of codes thereby identifying the bearer of the document or card.

The device includes an encoding and a decoding section. The encoding section permits the device to be programed in accordance with the second code which visibly appears on the card or document by manually operating a rotary switch and selectable push buttons.

The decoding section is operated by the manipulation of a second set of push buttons in order to enter the first code in the device. The device electronically compares the decoding first code with the encoded second code so that when the two codes correspond a visual indication is registered and the bearer of the document is sufficiently identified.

4 Claims, 3 Drawing Figures

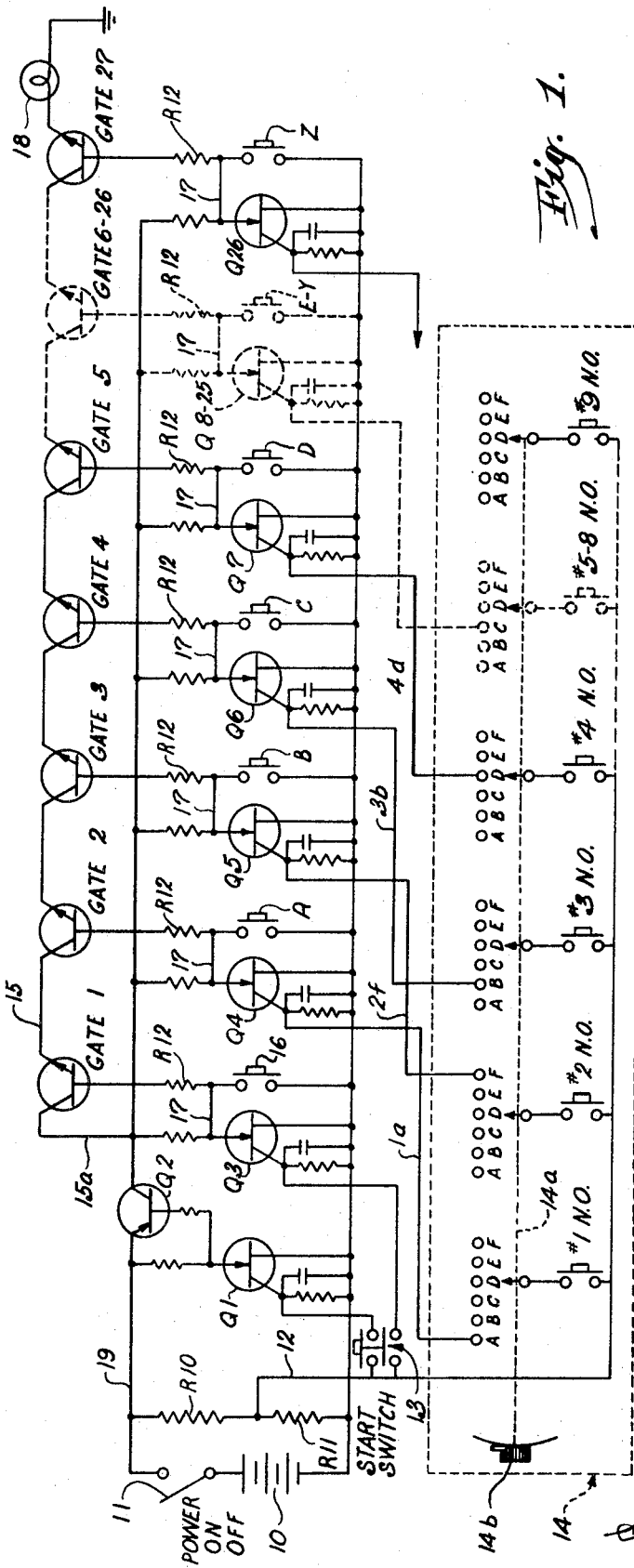
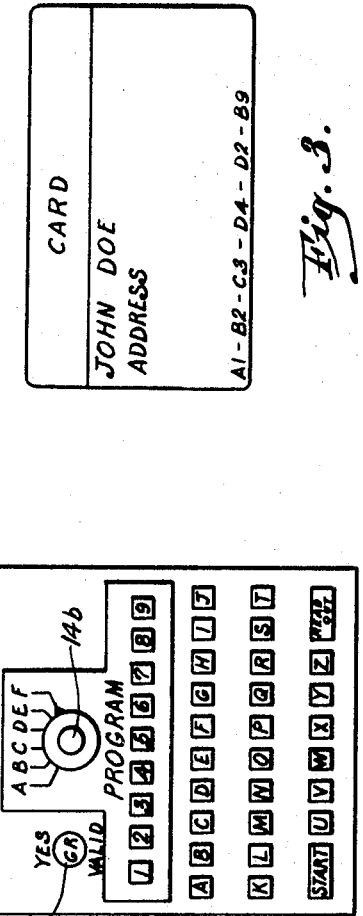
Fig. 1.
Fig. 2.
Fig. 3.
INVENTOR.
Charles V. Crane
BY
ATTORNEYS

3,656,110

CREDIT CARD ASSOCIATED APPARATUS FOR PERSONNEL IDENTIFICATION

BACKGROUND AND BRIEF DESCRIPTION OF THE INVENTION

The above-described device-implemented process and/or device itself can be used in any area where security identification is important. Likewise, the document or card facilitating the identification can take on various forms such as personalized checks, charge plates, credit cards, and/or credit information tokens etc.

Other means have been disclosed for validating credit cards or for verifying the ownership of same. In this regard, the one feature common to all known card or document verifiers resides in the utilization of the card or document as an integral part of the process and operation of the device. Thus, the card or document and the verifying device must be physically accessable to each other before verification can be accomplished. Such verifying devices have included photo readers, magnetic and raised indicia readers, finger hole readers and combination of lock-type cards all of which require the card to be worked on by the device.

My invention permits the verifying device to be remotely located from the card and telephone or intercom communication to be used for personal and/or document verification. My device-implemented process requires that a first code word by assigned to the document or card which does not appear anywhere on same. This code word is memorized by the owner of the card or the one seeking to be identified by either the card or the document in conjunction with the subject process. A second code consisting of letters and numbers is imprinted on the document or card and will be programed in the code interpreting device. The programming of the visible code is performed by the encoding section of the device which is comprised of a rotary switch in conjunction with individual push buttons numbered 1 through 9. The rotary switch provides the letter encoding digit while the push buttons facilitate the encoding of the number associated with the letter-number group. The owner or bearer of the card then enters or has entered the code word on the decoding section of the device by depressing the appropriate decoding push buttons labeled A through Z, and if the code word corresponds to the programed encoded code, the device indicates a corresponding condition thereby identifying the bearer of the document or card.

An object of my invention is to provide a uniquely constructed device and device-implemented process.

Another object of my invention is to provide a uniquely constructed code interpreting device having encoding and decoding sections which cooperate with appropriately designated rotary switches and push buttons and which program, compare, and indicate when two codes correspond for the purposes of verification and/or identification.

A primary object of my invention is to provide a device and device-implemented process which permits the verification of ownership of documents and/or cards without the required physical presence of the document and/or card with the device.

A further object of my invention is to provide a code interpreting device which includes an encoding and a decoding section. It is a feature of my invention that both sections utilize a plurality of silicon controlled rectifiers in conjunction with a series AND gate to facilitate a code comparison for personal identification.

A further object of my invention is to provide a unique device-implemented process for verifying the identity of the bearer of the card or document comprising the steps of assigning a word code to said document or card with said word code not appearing on said document or card, however known to the bearer of same, assigning a second code to said document or card and visibly displaying same thereon, programing a code interpreting device with said second code, comparing said programed second code with said first code by said device, and indicating by said device when said first code corresponds to said second code as a result of said comparing step, said corresponding codes thereby identifying the bearer of the document or card.

A still further object of my invention is to provide a uniquely constructed device for utilization in a device-implemented process for identity verification which is simple to operate, low in cost, and extremely rugged with a minimum of moving and mechanical parts thereby prolonging the operating life of same.

Another object of my invention is to provide a unique device-implemented process of the character described which permits the process to be performed (that of identifying or verifying) at a location remote from the device itself. In this manner, a centrally located code interpreting device may service a plurality of processing stations thereby substantially increasing the availability of the process.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith, and in which like reference numerals are employed to indicate like parts in the various views:

FIG. 1 is a schematic diagram of the coding interpreting device;

FIG. 2 is a top plan view of the exterior of the device including the push buttons, rotary switch knob and the indicating lamp; and FIG. 3 shows a typical card indicia needed for operation of my process and device.

Turning now more particularly to the drawing, reference numeral 10 designates the source of DC potential for the code interpreting device which is shown in FIG. 1 as a conventional battery. Power to the remainder of the circuitry is controlled by an on-off switch 11. A voltage divider generally represented by the resistors R10 and R11 drop the voltage to about 25 percent of the battery voltage. In this manner, the voltage appearing on line 12 is of a suitable size for the purpose of gating a plurality of SCR's to the on condition. A double pole single throw push button 13 interconnects the power line 12 with the gate terminals of SCR's designated as Q1 and Q3.

Power line 12 is also interconnected to one side of nine (9) normally opened switches which bear the numerals 1 through 9. The push buttons (1-9) cooperate with the nine pole six position rotary program switch (discussed later in more detail) which is generally indicated by the numeral 14. As will be seen, the rotary switch 14 is comprised of nine (9) of terminal sets with each set having terminals A through F labeled thereon. A central shaft 14a rotated by knob 14b, moves in unison the wiper arms of all nine (9) terminal sets so that knob 14b is located at the F indicia (as seen in FIG. 2), all wiper arms come to rest on the F terminal of its respective terminal set. As suggested above, the push buttons 1 through 9 are normally open, however each will momentarily interconnect its respective terminal set with line 12 for the purpose of properly biasing the selected lettered terminal thereon (A through F).

As suggested above, a plurality of SCR's comprise a portion of the code interpreting device but also operate to condition a series AND gate (generally represented by the numeral 15). SCR's Q1 and Q3 are conditioned by start switch 13 with push button 16 operatively associated with SCR Q3 while push button A-Z operatively associate with SCR's Q4 through Q29 respectively. Transistor Q2 (PNP transistor), acts as a current switch and interconnects with the anode of the Q1 SCR, same having its gate electrode connectible through the start switch 13 to the positive potential on line 12.

The collector of Q2 is interconnected via line 15a to the collector of the gate 1 transistor (an NPN transistor). The base of the gate 1 transistor is interconnected through resistor R12 to one end readout push button switch 16, same being normally opened and having its other end connected to the system ground. In a similar manner, push buttons A through A interconnect with the bases of the transistor gates 2 through 27, there being a line 17 in all of the push button-SCR circuits which interconnects the anode of each SCR to the push button side of its respective resistor R12 (likewise common to all push button-SCR circuits). It is further noted that the cathode of the SCR's are tied directly to the system ground while the gate terminals of the SCR's Q4 through Q29 are jumper connected with an appropriate one of the program terminals A through F in rotary switch 14. Of course, it is contemplated that selected ones of the rotary switch letter terminals may be dummies having no connections to gate terminals in order to further confuse any attempt to recreate the code interpreting device.

The series AND gate 15 is comprised of NPN gate transistors 1 through 27 and has indicating lamp 18 in series therewith so that when AND gate 15 is enabled, indicating lamp 18 will turn on thereby visibly indicating that a proper code word has been inserted into the code interpreting device corresponding to the visible code on the card or document.

OPERATION

It is contemplated that this device and device-implemented process can be used in any area where an unknown person needs to have himself identified. For purposes of simplification only, the particular embodiment disclosed hereinafter is related to the use of a credit card, however, it should be clearly understood that both the process and the device could be utilized in personal check identification, a quick credit check where credit information is maintained on general purpose computers, in security situations where identities are screened and code words given prior to entrance into restricted areas, and in any situation which is conducive for code words and code numbers to be assigned to individuals or groups of individuals and maintained in secret by the assigning agency.

In addition to the bearers name and address etc., the credit card or document will have a set of six to eight individual code groups e.g. A-1; B-2, C-3; D-4; D-2; and B-9 (see FIG. 3). All 26 letters will be used as will the numerals 1 through 9 in making up the code groupings. In this manner, the possible combinations of such code groupings is almost unlimited. It is contemplated that selected lists of several thousand six to eight code groupings will be supplied to credit card manufacturers to be placed on their cards. These manufacturers will in turn send the printed cards with the code groupings thereon to a central agency hereinafter identified as the holding corporation who will in turn assign a *code word* having from two to six letters and then mail the credit card and the code word to the person or persons whose name and address appears thereon. It is highly important that only the corporation has the master key to the assigned code words and their corresponding individual code groups and that very strict security precautions are taken to insure that the key is not broken. As a result, the recipient of the card will have his assigned code word as well as his card or cards and he alone will know the code word.

The device described above provides a means for programing same with the letter-numeral groups on the credit cards and, at the same time, includes a means for decoding or comparing the code word with the programed letter-numeral group in order to verify that the bearer of the credit card is in fact the owner. The valid indicating lamp 18 will become illuminated upon the proper correlation between the code word and the letter-numeral code groupings so as to give a visual indication that the process has been successfully completed.

Utilization of the code interpreting device and the device-implemented process is initiated by placing the power on-off switch 10 to the on position. As a result, line 19 will have a high potential thereon and the voltage divider R10 and R11 brings the potential on line 12 down to approximately 25 percent of that on line 19. The emitter on Q2 likewise has a high potential thereon as does the anode of SCR Q1. It is significant to note that with the voltage on the base of Q2 (a PNP transistor used as a current switch) at a sufficiently high level at this time so that Q2 is cut of and no current is allowed to flow through Q2 to the AND gate (gates 1 through 27).

The momentary start switch 13 is then depressed placing a high potential from line 12 on the gate electrodes of SCR's Q1 and Q3 causing same to be turned on. Accordingly, the anode of Q1 will go from a high potential to near zero, likewise, pulling the base of transistor Q2 to a lower level. With the base of Q2 at a low value, Q2 will now conduct and current will be allowed to flow therethrough to AND gate 15. As suggested above, momentary switch 13 is a double pole switch which operates to simultaneously control the gating potential on the gate terminals of both SCR's Q1 and Q3. With the anode of Q3 at a low value (after having been turned on), the base potential on gate 1 transistor of the series AND gate is also low thereby turning same off and necessarily disabling AND gate 15.

Summarizing the above, with the current switch Q2 conducting, all of the letter associated SCR's (Q4 through Q29) will have a high anode potential as will the bases of the transistors which comprise gates 2 through 27 of the series AND gate 15. Accordingly, all transistors (gates 2–27) are turned on, however, the gate 1 transistor is turned off thereby causing AND gate 15 to have a low output at this time which is insufficient to turn on indicating lamp 18.

The rotary program switch 14 being a nine (9) pole six position switch has 54 active contacts, however, only 26 contacts are used (26 letters in the alphabet) thereby leaving 28 no contact or open circuits. Each of the pole contacts (the nine (9) wiper arms associated with their respective A through F contacts) are connected to the 1 through 9 momentary contact program push button switches.

As indicated above, the identification number pertaining to a particular credit card or document may comprise the letter number groups of A1–B2–C3–D4–D2–B9. To begin programing or encoding the code interpreting device with such an identification number, the rotary switch (knob 14) of the encoding section is rotated (shaft 14a rotates all of the wiper arms so that contact is made with the A terminal of each pole) and the push button No. 1 is depressed. This interconnects the high potential on line 12 with the gate electrode on SCR Q4 (note jumper line 1a) turning on same so that the high base voltage on the transistor of gate 2 is pulled low through the now turned on SCR Q4. With the high potential removed from the base of the transistor gate 2, this gate is turned off thereby assuming an open circuit condition insofar as AND gate 15 is concerned. A rotary switch is then accordingly moved to the contact B, push button No. 2 is depressed, however no change is effected on the SCR bank since the B terminal associated with push button No. 2 has no jumper connection leading therefrom. The same holds true for the C–3 portion of the code (there being no connection from the C terminal associated with push button No. 3), however, at the code D–4 there is a jumper connection (4d) to the gate of SCR Q7 (corresponding to the letter D) which turns on Q7 thereby pulling the base on transistor gate No. 5 from a high to a low position so that same is also turned off to approximate the open circuit insofar as the series AND gate is concerned. The D2 and the B9 portions of the code are without connections and do not effect the SCR banks so that the attempted encoding of same changes nothing. It should be understood that the condition of the no connection terminals of the nine (9) pole terminal strips are unknown to anyone except the manufacturer and are so encapsulated that they may not be torn down or X-rayed in an effort to detect terminal connection condition.

As suggested above, since the 26 SCR circuits are identical, only four of same have been shown (Q4 through Q7) as operating with the lettered push buttons. It may, therefore, be seen that after programing or encoding the code interpreting device with the identification number, the following conditions exist on the SCR circuits and related AND gate transistors:

(1) SCR Q3 is conducting cutting off transistor gate 1 of AND gate 15; (2) SCR Q4 is conducting cutting off transistor gate 2; (3) SCR Q5 is not conducting, therefore allowing transistor gate 3 to remain on; (4) SCR Q6 is not conducting, therefore transistor gate 4 remains on; (5) SCR Q7 is turned on thereby turning off transistor gate 5; and (6) the remaining SCR's are off (Q8 through Q29) so that transistor gates 6 through 27 are on and approximating a closed circuit for series AND gate 15. This operation completes the programing or encoding step of the process.

As mentioned above, the code number is programed or encoded into the code interpreting device by the encoding section which is comprised of the rotary switch and the push buttons 1 through 9. The next step is to decode the encoded information by comparing a selected code word therewith. Assume that the code word Ad corresponds to the identification number and that same has been orally given to the operator of the code interpreting device. At this time the code word AD is entered into the device by selectively depressing first push button A and secondly the push button D. When push button A closes, a short circuit appears across the anode to the cathode of SCR Q4, thusly causing same to loose its holding current and to turn off thereby approximating an open circuit. This causes the anode of SCR Q4 and the base of transistor gate 2 to go to a high potential thereby turning the associated transistor on and closing the gate. In a similar manner, the momentary depression of the push button D results in the turning on of transistor gate 5. At this time all transistor gates 2 through 37 are turned on, however transistor gate 1 remains off. When the readout switch 16 is momentarily depressed, SCR Q3 turns off and the transistor gate 1 is turned on so that all gates 1 through 27 are closed thereby providing a closed circuit current path to illuminate indicating light 18.

Using the same program, A1–B2–C3–D4–D2–B9, the letters A and D were programed to open gates 2 and 5. If the code word AT were entered instead of AD, the letter A would close gate 2 as programed but the letter T, having not been programed, would not close gate 5 so that when readout switch 16 was depressed, transistor gates 1 through 4 and gates 6 through 27 are closed but gate 5 is open so that no current would be allowed to flow through the series AND gate. Therefore the indicating lamp 18 would not be illuminated when readout was called for.

It is therefore seen that with the program entered in the code interpreting device, the proper code word must be given and entered into the decoding or comparing section of the device. When the proper code word corresponds with the programed code, the indicating lamp 18 is illuminated to verify the ownership of the card or the authenticity of this suspected document. The absence of illumination of the indicating lamp will mean that the code word was incorrect and very likely that the bearer of the card is not the proper owner.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A device for verifying the identity of the bearer of a document or card, said document or card having coded indicia thereon with a separate code word assigned thereto but not appearing on said card or document, said device comprising:
    a manually operable keyboard,
    an encoding section comprising a portion of said keyboard and, said encoding section including a means for programing said device with a code represented by said coded indicia appearing on said document or card,
    a decoding section comprising a portion of said keyboard and interconnected with said encoding section, said decoding section including means for entering said separate code word known only to the bearer of said document or card in said device without the use of said card or document,
    an indicating element, and
    means for operating said indicating element when said bearer's code word correlates with said programed code to verify the identity of the bearer of said document or card.

2. The invention as in claim 1 wherein said programing means includes
    the first switch means for selecting any one of a plurality of letter designated positions, a second switch means for selecting any one of a plurality of number designated positions,
    a plurality of semiconductor elements connected with said first and second switch means, said semiconductor elements having an on condition and an off condition, said first and second switch means operable to turn certain ones of said semiconductor elements on when said code is programed.

3. The invention as in claim 2 wherein said entering means in said decoding section includes a means for selecting certain letter designated switches in order to spell said code word thereon, said entering means letter designated switches connected with said semiconductor elements in such a manner to turn off the semiconductor elements that were turned on by said programing means.

4. The invention as in claim 3 wherein said operating means includes a source of electrical power, an AND gate, said AND gate connected between said power source and said indicating element, said semiconductor elements operable to enable said AND gate when in said off condition and to disable said AND gate when any one of said semiconductor elements is in said on condition.

* * * * *